(12) United States Patent
Rochon et al.

(10) Patent No.: US 9,755,955 B2
(45) Date of Patent: Sep. 5, 2017

(54) SINGLE QUEUE LINK AGGREGATION

(71) Applicant: Accedian Networks Inc., St-Laurent (CA)

(72) Inventors: Steve Rochon, Brossard (CA); Yanick Viens, St-Jean-sur-Richelieu (CA)

(73) Assignee: Accedian Networks Inc., Saint-Laurent (CA)

( * ) Notice: Subject to any disclaimer, the term of this patent is extended or adjusted under 35 U.S.C. 154(b) by 0 days.

(21) Appl. No.: 14/625,346

(22) Filed: Feb. 18, 2015

(65) Prior Publication Data

US 2016/0241480 A1 Aug. 18, 2016

(51) Int. Cl.
*H04L 12/709* (2013.01)
*H04L 12/741* (2013.01)
*H04L 12/823* (2013.01)
*H04L 12/861* (2013.01)

(52) U.S. Cl.
CPC .......... *H04L 45/245* (2013.01); *H04L 45/745* (2013.01); *H04L 47/32* (2013.01); *H04L 49/90* (2013.01)

(58) Field of Classification Search
CPC ......... H04L 12/26; H04L 12/56; H04L 45/28; H04J 3/26
See application file for complete search history.

(56) References Cited

U.S. PATENT DOCUMENTS 7,236,489 B1 * 6/2007 Wyatt .................. H04L 49/103
370/392
7,936,770 B1 * 5/2011 Frattura ................. H04L 49/90
370/351

* cited by examiner

*Primary Examiner* — Lakeram Jangbahadur
(74) *Attorney, Agent, or Firm* — Nixon Peabody LLP (57) ABSTRACT

A method for transmitting a packet on a logical port comprising two or more physical ports comprises receiving a packet of a class of service; storing the packet in a memory; maintaining a lookup table relating a plurality of identifiers to at least one physical port; storing a pointer to the stored packet in the memory in a single pointer list for the class of service along with a selected one of the identifiers; and copying the stored packet to one or more physical ports corresponding to the selected identifier for transmission on at least one of the physical ports. In one implementation, a plurality of the physical ports are grouped into a logical port, and the received packet is processed to determine its logical port and its class of service.

14 Claims, 6 Drawing Sheets

SINGLE QUEUE LINK AGGREGATION

FIELD OF THE INVENTION

The present disclosure relates to queuing system for link aggregation.

SUMMARY

In accordance with one embodiment, a method for transmitting a packet on a logical port comprising two or more physical ports comprises receiving a packet of a class of service; storing the packet in a memory; maintaining a lookup table relating a plurality of identifiers to at least one physical port; storing a pointer to the stored packet in the memory in a single pointer list for the class of service along with a selected one of the identifiers; and copying the stored packet to one or more physical ports corresponding to the selected identifier for transmission on at least one of the physical ports. In one implementation, a plurality of the physical ports are grouped into a logical port, and the received packet is processed to determine its logical port and its class of service. The method preferably identifies a physical port to which the received packet is to be transmitted, and a metadata lookup table is used to identify the physical port to which the received packet is to be transmitted.

In accordance with another embodiment, a system is provided for transmitting a packet on a logical port comprising two or more physical ports. The system comprises a memory storing a received packet of a class of service; a lookup table relating a plurality of identifiers to at least one physical port; a memory storing a pointer to the stored packet in the memory in a single pointer list for the class of service along with a selected one of the identifiers; one or more physical ports corresponding to the selected identifier for transmitting a stored packet to at least one of the physical ports; and a scheduler copying the stored packet to one or more of the physical ports. In one implementation, a plurality of the physical ports are grouped into a logical port, and the system includes a processor configured to determine its logical port and class of service of the received packet. The scheduler is preferably configured to identify a physical port to which the received packet is to be transmitted, and the system includes a metadata lookup table to identify the physical port to which the received packet is to be transmitted.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

REFERENCES

International Telecommunication Union—Telecommunication standardization sector (ITU-T). SERIES G: TRANSMISSION SYSTEMS AND MEDIA DIGITAL SYSTEMS AND NETWORKS Packet over Transport aspects—Ethernet over Transport aspects. SERIES Y: GLOBAL INFORMATION INFRASTRUCTURE, INTERNET PROTOCOL ASPECTS AND NEXT-GENERATION NETWORKS Internet protocol aspects—Transport. G.8032/Y.1344.

DETAILED DESCRIPTION

A ring network consists of several nodes that are interconnected to provide a bi-directional ring wherein each node can reach each other node in one direction or another based on a configuration that may changes with time (e.g. at a link failure). Link aggregation (LAG) applies to various methods of combining (or aggregating) multiple network connections or ports in parallel in order to increase throughput beyond what a single connection or port can sustain, and to provide redundancy in case one of the connection or port should fail. Generically, network nodes may consists of one or more physical ports with some of the physical ports grouped together into logical ports. In the case of a ring, the two ring ports can be considered one logical port. In case of a LAG, the link aggregation is the logical port aggregating several physical ports.

Figure 1A:
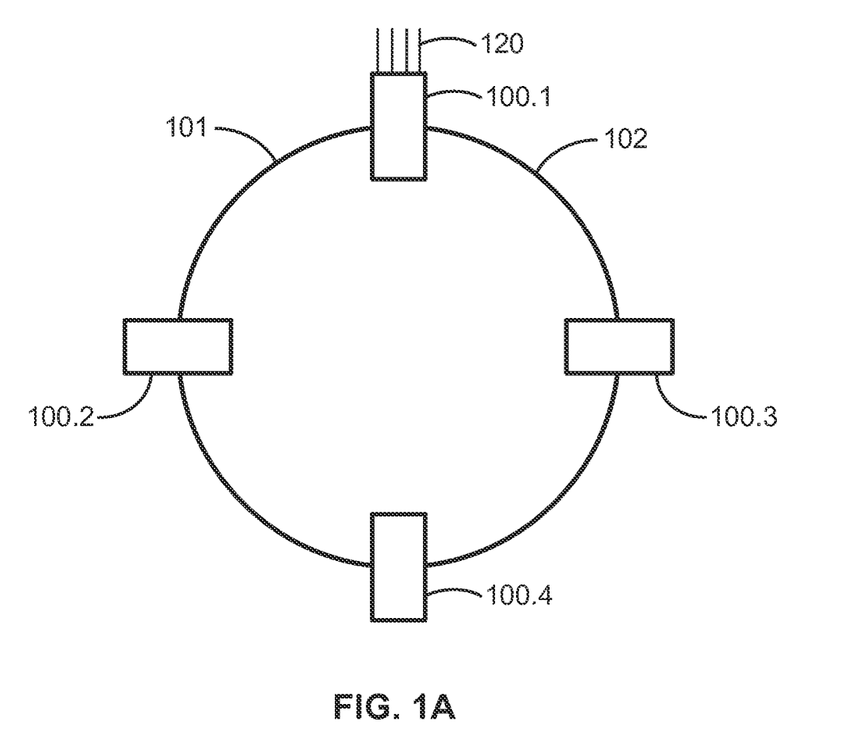
FIG. 1A is a diagrammatic illustration of a ring network.

FIG. 1A shows an example of a ring network comprising four nodes 100.1, 100.2, 100.3, 100.4 interconnected. Each node has two rings ports/links 101, 102 and one or more User to Network Interface (UNI) port(s) 120. The node 100.1 sends a packet destined to another node to ring port #1 101 and/or to ring port #2 102, depending on the status of the links in the ring (e.g. failure) and/or whether the destination of the packet has been learned, the learning has not expired or the destination has not aged. The two ring ports are the physical ports and they are logically grouped as one logical port.

Figure 1B:
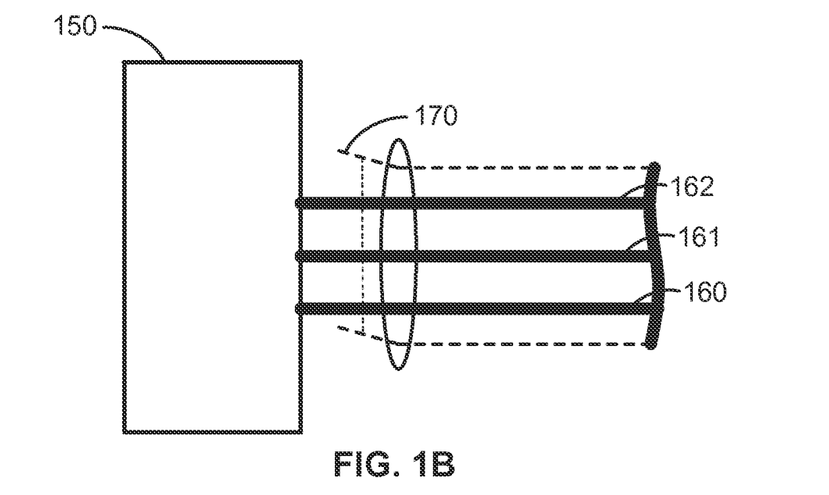
FIG. 1B is an example of a link aggregation (LAG) port.

FIG. 1B shows an example of a node 150 that supports a logical port (LAG) 170 over three physical ports 160, 161, 162. In this case, the traffic is split between the three ports according to a predetermined setting to achieve predetermined objectives (e.g. even loading, order preservation, backup link).

In existing systems handling logical ports, when the current settings that selects which of the multiple physical ports to send a packet changes (e.g. because of link failure or fading for example), packets awaiting transmission on a physical port that is no longer used or that has failed are lost or transmitted out of order later on. This problem increases in complexity when several logical ports are aggregated together. There is a need to prevent loss of data or misordering of data when handling LAG or in a ring application. There is also a need to increase the speed of the switch over when the link status or the configuration settings changes.

Figure 2:
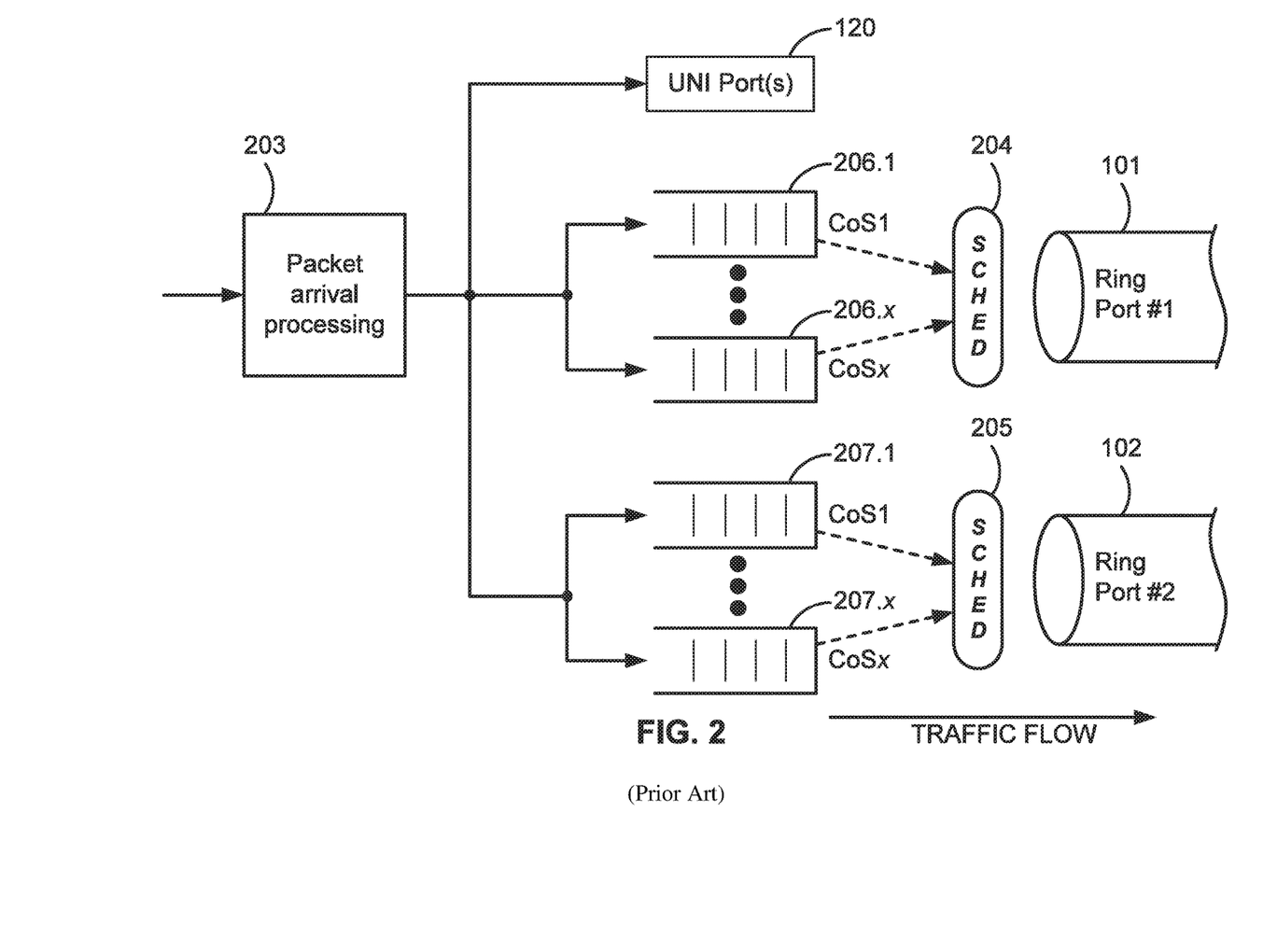
FIG. 2 is a diagram of a prior-art implementation of a ring node.
Figure 3:
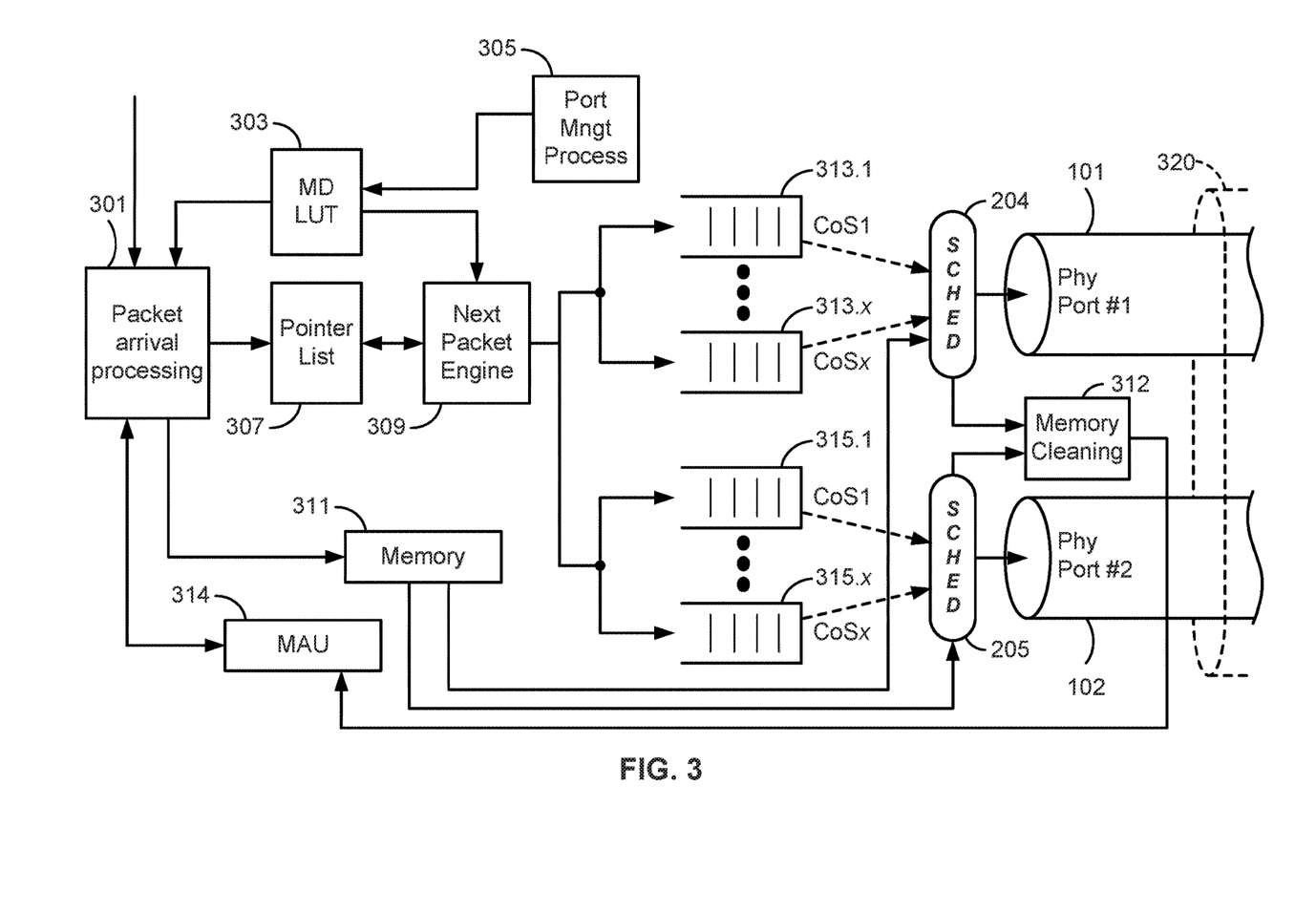
FIG. 3 is a diagrammatic illustration of a single queuing system used by two ring ports.

The first embodiment is described in the context of a ring network. FIG. 2 shows an example of a prior art generic node architecture implementing a ring function with one or more UNI ports 120 (not detailed) and two ring ports 101, 102. In this example a packet arrival processing function 203, receives a packet (either from a ring port or a UNI port) and determines its destination and its Class of Service (CoS), from one or more CoS supported by the node. If the packet is destined for ring port #1 101, it is placed in a queue based on its CoS 206.1 . . . 206.x. If the packet is destined for ring port #2 101, it is placed in a queue based on its CoS 207.1 . . . 207.x. A scheduler 204 selects which packet from the different queues 206.1 . . . 206.x to transmit next onto ring port #1 based on one or more scheduling algorithm, which are known in the art. Similarly, a scheduler 205 selects which packet from the different queues 207.1 . . . 207.x to transmit next onto ring port #2 based on a scheduling algorithm, which are known to someone skilled in the art FIG. 3 shows an example of an architecture implementing the first embodiment on a generic node where the two physical ports 101, 102 are grouped into a logical port 320. The architecture may support several other logical and physical ports but only one is shown for simplicity. The embodiment is first described in the context of a ring node. In this example, the logical port 320 comprises two physical ports 101, 102. In this example a packet arrival processing function 301 determines the logical port (which could contain several physical ports) of the packet along with its required CoS. If the packet is destined to at least one ring ports, a metadata (MD) lookup table (LUT) 303 is used to identify the physical port. A packet pointer (or address) is taken from a Memory Allocation Unit 314 (MAU). The packet is placed in memory 311 at the pointer (or address) location and the pointer to the packet is placed in a pointer list 307 (as described below) with the MD. A port management process 305 updates the MD LUT 303 when there are changes in the status of the ports (e.g. failure) or changes in the assignments of the ports. The memory 311 can be managed using any memory management technique known to someone skilled in the art (e.g. contiguous, dynamic).

A Next Packet Engine (NPE) 309 maintains small transmit First-In-First-Out (FIFO) 313.1 . . . 313.x, 315.1 . . . 315.x queues for each CoS filled with the pointers to the next packets to send. The FIFO are as small as required to maintain line rate transmission on the physical port. Schedulers 204, 205 select which FIFO to serve next and transmit the packet from the memory 311 location pointed by the pointer. The memory is cleaned 312 periodically to return the pointers (or address) to the MAU when there are packets that are no longer awaiting transmission on a port.

Figure 4:
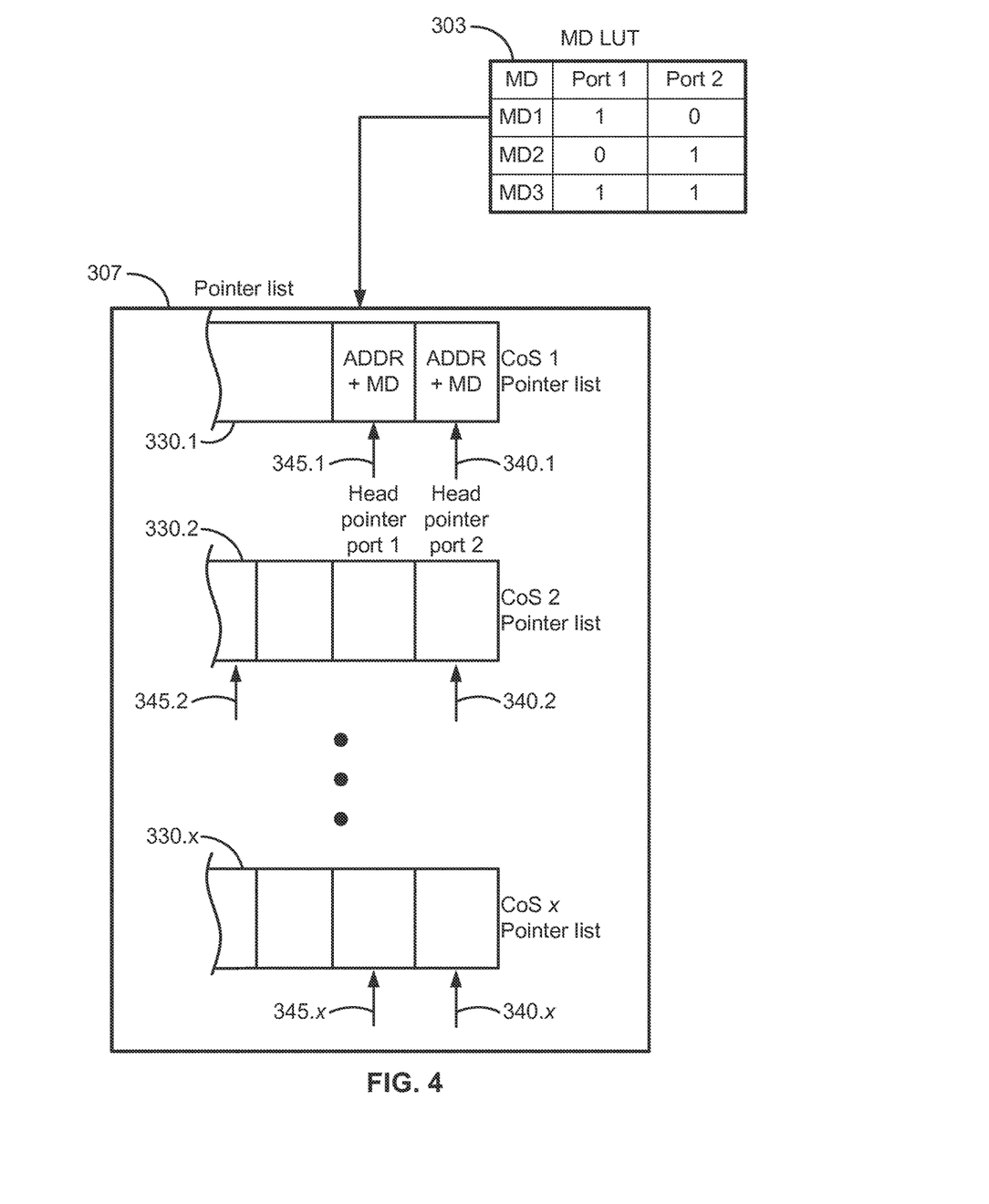
FIG. 4 is a diagrammatic illustration of the pointer list and the lookup table.

FIG. 4 shows more details of an implementation of a pointer list 307 and MD LUT 303. The pointer list 307 comprises a queue for each CoS 330.1 . . . 330.x supported by the system. The queue, preferably arranged as a FIFO, orders the pointers to (or the address of) a packet in memory 311 along with the relevant MD. There are two heads 340.1 . . . 340.x, 345.1 . . . 345.x to each CoS pointer list. The head corresponds to the location of the pointer for the next packet to be checked for a given physical port for a given CoS. An example MD LUT is also shown. There can be a plurality of MD codes which (shown for illustration as MD1, MD2, MD3) correspond to one or more physical ports on which to transmit the packet. The MD code MD1 indicates to transmit the packet on port #1, MD2 on port #2 and MD3 on both ports. The pointer list may keep additional information about the packet as necessary for the memory management system (e.g. packet size).

Figure 5:
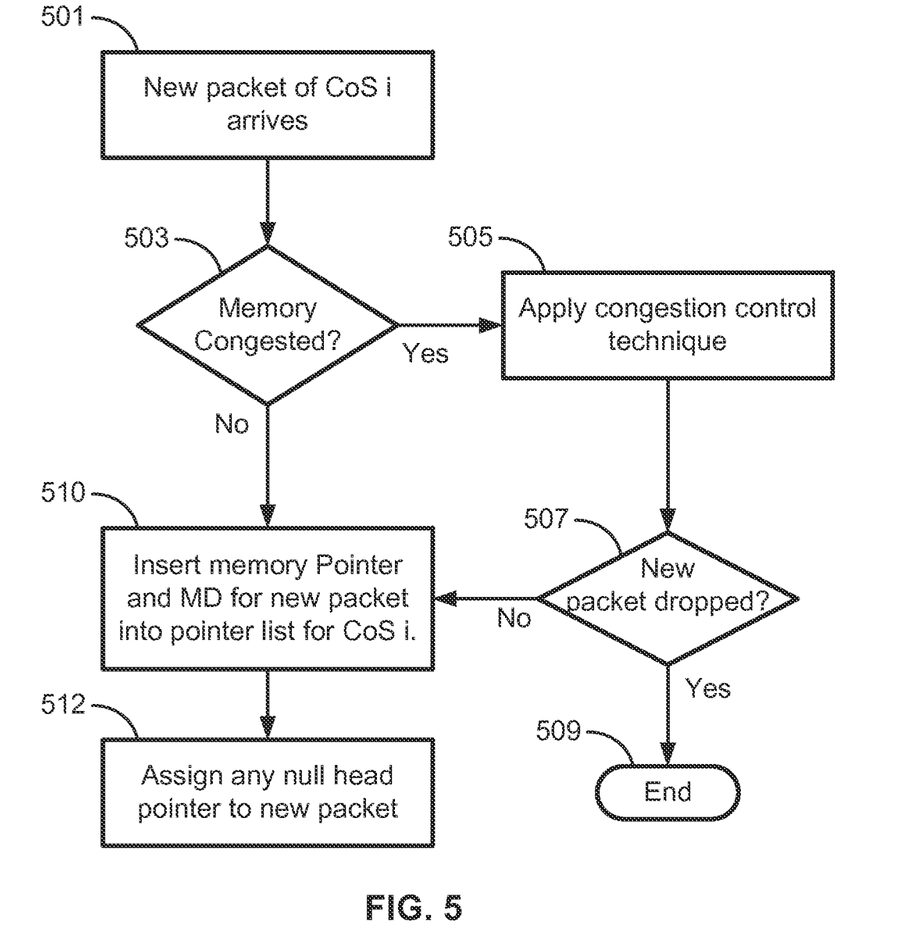
FIG. 5 is a flow chart of a procedure for handling a new packet arriving at a ring node.

FIG. 5 shows steps performed by the packet arrival process 301. When a new packet arrives, its CoS is determined along with other parameters such as the destination(s). The memory congestion status is determined 503 (using any technique known to someone skilled in the art). If the memory is deemed congested, then congestion control or avoidance techniques known to someone skilled in the art are applied to reduce the congestion 505. The congestion control or avoidance techniques may select packets already in the queue to be deleted or may select the new incoming packet 507 in the latter case, then nothing further is done 509, in the former case the new packet is written to memory 311, and a pointer to the memory (or the address of the memory) along with MD corresponding to the destination(s) are inserted at the end of the pointer list 330.1 . . . 330.x corresponding to the packet's CoS 510. If there are any head pointers for any ports with nothing assigned or pointing to NULL 512, then they now point to the entry for the new packet.

Figure 6:
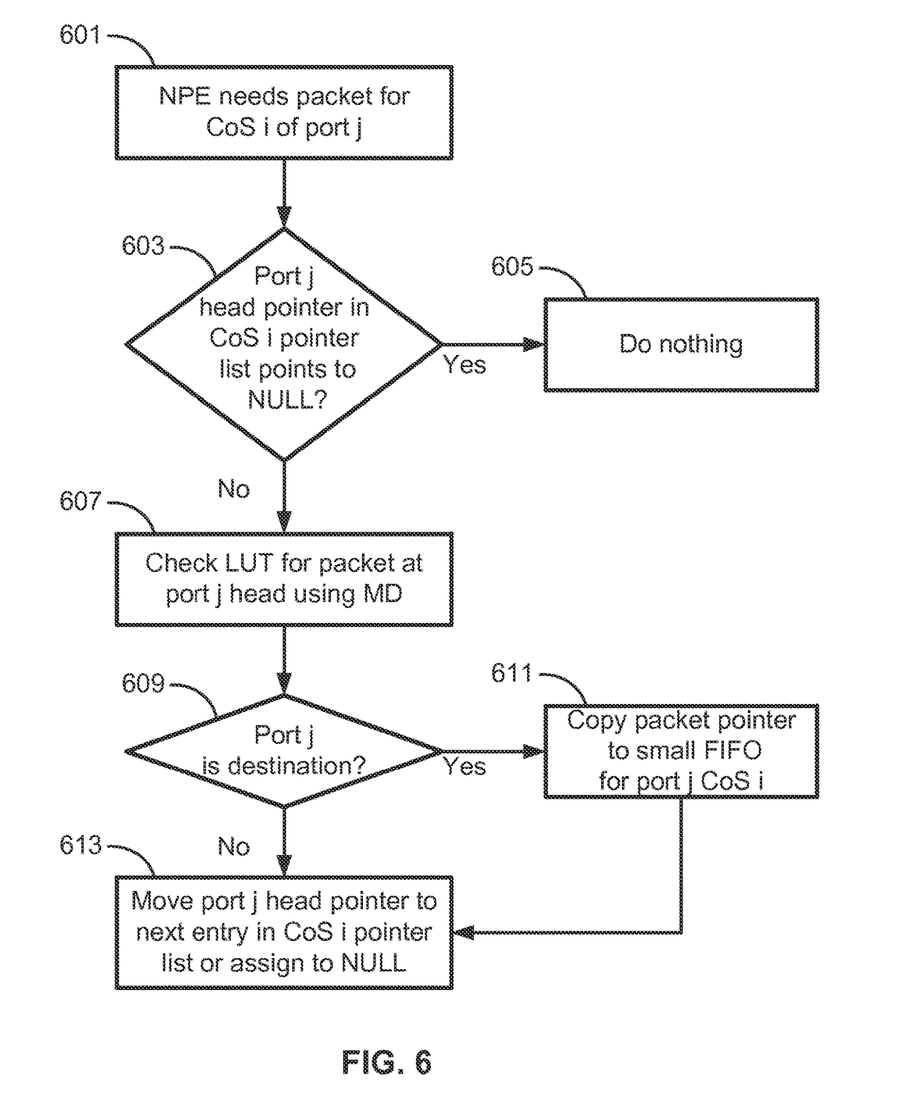
FIG. 6 is a flow chart of a procedure for moving packets from a single queue to small transmit queues.

FIG. 6 shows steps performed by the NPE 309 on one logical port when one of a small transmit FIFO 313.1 . . . 313.x, 315.1 . . . 315.x for CoS i of physical port j is empty or near empty 601. The NPE can be notified of the status by a signal or any other technique. The NPE checks whether the head 340.i or 345.i of physical port j in the CoS i queue of the pointer list 307 is assigned to an entry 603. If it points to nothing, then there is nothing to transmit on that port for that CoS. Otherwise, the LUT is indexed with the MD of the entry pointed to by the head 340.i or 345.i of physical port j in the CoS i queue of the pointer list 307. If port j is listed as a destination 609, a copy of the packet pointer is placed in the small transmit FIFO for CoS i of port j. The head for port j is moved to the next entry in the CoS i pointer list 613. If the head for port j pointed to the last entry in the queue, the head for port j then points to NULL or is unassigned.

One of the benefits of this embodiment is that the port management process 305 can update the MD LUT to indicate a change in the port assignments while the packet is waiting to be transmitted. The packet is not committed to a physical port until it is just about to be transmitted. Therefore if the physical port #1 fails, the port management process 305 updates the MD1 entry in the LUT to indicate that the packets with MD=MD1 should be transmitted on port #2. The MD3 entry is modified to remove port #1, as a destination. All the packets that are awaiting transmission in the pointer list 307 are sent instantaneously to the new configuration until it changes again. Similarly, if a link in the ring fails, the nodes are informed of the failure and they flood both ports, therefore the LUT would have all entries sending to all ports until the auto-learning process learns The embodiment of a LAG is a generalization of the above embodiment where a plurality of physical ports are aggregated into one logical port. There is one head pointer for each physical port in the pointer list for each COS and one group of small transmission FIFO for each port along with a scheduler. The MD LUT can contain a large number of entries. For example an MD of 8 bits provides 256 choices of distribution for the packets. For example, with 4 ports in the logical link, there are approximately 64 LUT entries per port, with two ports in the logical link, there are approximately 127 LUT entries per port. Different distribution of bandwidth can be achieved by allocating the MD values to the ports. When the packet arrives, a hashing function can be used to generate the MD value and ensure each flow uses always the same MD value.

When adding a physical port or changing the distribution on the ports, the MD LUT is duplicated, one copy remains as the old LUT. The new LUT is modified to take into account the change that occurred. The head pointer that is at the highest position is used to indicate the transition point. The head pointers for the other physical ports use the old LUT until they reach the transition point, at which point they start using the new LUT.

When a physical port f fails in the LAG, to minimize packet loss, an additional safety pointer can be added for each port in each pointer list queue. In this embodiment, for each pointer list queue there is a head pointer and a safety pointer for each port. When entering safety mode because of failure of port f, the safety pointers for each ports point the head pointer that is the least advanced in the pointer list. When a failure occurs the MD LUT is duplicated and one copy remains as the old LUT. A new MD LUT is computed to take into account the failure. When the NPE needs a packet for port j, it uses the safety pointer for port j to check the packet using the old LUT. If the MD of the old LUT indicates the packet was to be sent to port f, then the new LUT is checked to see whether the MD is now using port j, in which case, the packet is sent to the small FIFO for port j. The safety pointer is used until it reaches the head pointer for the port, at which point the new MD LUT is used going forward. When all safety pointers for all ports have reached their head pointers, the safety mode is disabled.

When some of the ports are congested or running at lower speed, the head pointer for the least congested (or faster) port may become quite far apart from the head pointer for the congested (or slower) port. In this case, memory is held up and not usable for incoming packets. In another embodiment, when the different between the location of two head pointers is greater than a predetermined threshold, then the head pointer closest to the front is moved up by a predetermined amount and the memory associated with the packets ahead of it is eventually released by the memory cleaning function. In that case, some packets may be lost. This allows to improve the distribution of the MD values to maximise the utilisation of the ports.

Using this embodiment, there is no loss of data when a link is down or there is a switch to another link in the aggregation for reliability or load balance purpose since the packets are extracted from the same queue. This embodiment requires management of a lower number of queues.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for transmitting a packet on a logical port comprising at least two physical ports, the method comprising:
    receiving the packet of a class of service;
    storing the packet in a memory;
    maintaining a metadata lookup table that associates each metadata identifier of a plurality of metadata identifiers with one or more physical ports of the at least two physical ports, the maintaining comprising:
        identifying a failed port of the at least two physical ports and a first metadata identifier associated with the failed port, and
        modifying the metadata lookup table to associate the first metadata identifier with a working port of the at least two physical ports;
    storing a pointer to the stored packet in the memory in a single pointer list for the class of service along with the first metadata identifier, wherein the single pointer list is associated with a head pointer and a safety pointer;
    committing the stored packet to at least one of the at least two physical ports based on the metadata lookup table, the first metadata identifier, the header pointer and the safety pointer;
    copying the stored packet to one or more of the one or more physical ports associated with the metadata identifier; and
    transmitting the copy of the stored packet to the working port.

2. The method of claim 1 which includes a plurality of the at least two physical ports grouped into the logical port.

3. The method of claim 2 in which the received packet is processed to determine the logical port and class of service for the received packet.

4. The method of claim 1 which includes identifying at least one of the at least two physical ports associated with the metadata identifier based on the first metadata identifier and the metadata lookup table.

5. The method of claim 4 in which the metadata lookup table is used to identify the working port.

6. A system for transmitting a packet on a logical port comprising at least two physical ports, the system comprising:
- a memory storing a received packet of a class of service;
- a metadata lookup table that associates each metadata identifier of a plurality of metadata identifiers with one or more physical ports of the at least two physical ports, the metadata lookup table updated responsive to:
  - identifying a failed port of the at least two physical ports and a first metadata identifier associated with the failed port, and
  - modifying the metadata lookup table to associate the first metadata identifier with a working port of the at least two physical ports;
- a pointer to the received packet stored in the memory in a single pointer list for the class of service along with the first metadata identifier, wherein the single pointer list is associated with a head pointer and a safety pointer;
- a scheduler for copying the stored packet to at least one of the one or more physical ports associated with the first metadata identifier; and
- transmitting the copy of the stored packet to the working port.

7. The system of claim 6 in which a plurality of the at least two physical ports are grouped into the logical port.

8. The system of claim 7 further comprising a processor configured to determine the logical port and class of service of the received packet.

9. The system of claim 6 in which the scheduler is configured to identify at least one of the at least two physical ports associated with the metadata identifier based on the first metadata identifier and the metadata lookup table.

10. The system of claim 9 wherein the metadata lookup table identifies the working port.

11. The method of claim 1, wherein the metadata lookup table is updated responsive to a change in status of at least one of the at least two physical ports.

12. The method of claim 1, wherein the metadata lookup table is updated responsive to a change in assignment of at least one of the at least two physical ports.

13. The system of claim 6, wherein the metadata lookup table is updated responsive to a change in status of at least one of the at least two physical ports.

14. The system of claim 6, wherein the metadata lookup table is updated responsive to a change in assignment of at least one of the at least two physical ports.

* * * * *